United States Patent
Young et al.

[11] Patent Number: 5,902,090
[45] Date of Patent: May 11, 1999

[54] CARGO HANDLING TRUCK BED

[75] Inventors: Gregory C. Young, Grove City; James Jones, Cranberry Township, both of Pa.

[73] Assignee: ETA Industries, New Brighton, Pa.

[21] Appl. No.: 08/863,088

[22] Filed: May 23, 1997

Related U.S. Application Data

[60] Provisional application No. 60/018,237, May 24, 1996.

[51] Int. Cl.⁶ ..................................................... B60P 1/00
[52] U.S. Cl. ........................................... 414/527; 198/570
[58] Field of Search .................................... 414/509, 512, 414/513, 525.1, 527, 539; 198/570, 750.1, 750.2

[56] References Cited

U.S. PATENT DOCUMENTS

| | | | |
|---|---|---|---|
| 1,847,148 | 3/1932 | Vogeley | 198/570 |
| 1,970,900 | 8/1934 | Renwick et al. | 414/527 |
| 2,129,796 | 9/1938 | Swift | 414/527 |
| 2,563,158 | 8/1951 | Claffey | 414/527 |
| 3,370,695 | 2/1968 | Robson | 198/570 X |
| 3,586,156 | 6/1971 | Easley, Jr. | 198/570 X |
| 3,704,798 | 12/1972 | Carpenture, Jr. et al. | 414/527 |
| 4,142,625 | 3/1979 | Bourgeois | 198/570 |
| 4,441,003 | 4/1984 | Eves, II et al. | 198/570 X |
| 4,760,971 | 8/1988 | Hodgetts | 242/67.1 R |
| 4,887,937 | 12/1989 | Thunnissen | 414/527 |
| 4,892,456 | 1/1990 | Hodgetts | 414/527 |
| 4,948,325 | 8/1990 | Hodgetts | 414/527 |

FOREIGN PATENT DOCUMENTS

81695  6/1983  European Pat. Off. ............... 414/527

*Primary Examiner*—James W. Keenan
*Attorney, Agent, or Firm*—Webb Ziesenheim Bruening Logsdon Orkin & Hanson, P.C.

[57] ABSTRACT

A cargo handling truck bed that includes a material handling device having a base and two longitudinally extending conveyors. Each of the conveyors includes a longitudinally extending belt having a first end and a second end. A first drum is rotatably secured to the base and secured to the first end of the belt. A second drum is rotatably secured to the base and secured to the second end of the belt. The first drum is longitudinally spaced apart from the second drum. A first drive arrangement for rotating the first drum and a second drive arrangement for rotating the second drum for winding the belts around the respective drums are provided. A control is provided for driving the respective first drums and second drums. A guide and guide track are provided to keep the belts in alignment. Polyethylene bearings are provided to engage with the drums and limit switches are provided for stopping winding of the belts around the drums.

23 Claims, 9 Drawing Sheets

CARGO HANDLING TRUCK BED

CROSS REFERENCE TO RELATED APPLICATION

This application claims the benefit of U.S. Provisional Application Ser. No. 60/018,237, filed May 24, 1996.

BACKGROUND OF THE INVENTION

1. Field of the Invention

The present invention relates to a material handling device, and more particularly, to a cargo handling truck bed.

2. Description of the Prior Art

Manually moving and removing materials, such as boxes from truck beds, particularly from trailer beds, is time consuming. Material moving devices, such as single conveyors, have been developed to assist in moving materials from the truck beds. See, for example, U.S. Pat. No. 4,760,971, which is hereby incorporated by reference. Alternatively, rollers (either driven or undriven) have been utilized to roll the material from the truck bed.

A problem with the prior art conveyors is that all of the material or cargo, say boxes, must be moved simultaneously by the conveyor. In some instances, when only a portion of the cargo must be delivered, all of the cargo may have to be removed from the trailer and then the undelivered portion must be returned to the trailer.

To overcome this problem, the prior art roller arrangement has been modified to provide two separately driven roller sections extending along the length of the truck bed. The two sections of rollers are independently driven by separate chain and sprocket arrangements. The driven roller arrangement is expensive to manufacture and maintain due to the number of parts required, namely, rollers, chains and sprockets. Further, an inherent flaw of the driven roller arrangement is that cargo, such as boxes, may roll in the trailer bed when the rollers are not being driven and the trailer bed is inclined. This can pose a safety problem when unloading the trailer bed.

Therefore, it is an object of the present invention to provide a two-sectioned cargo handling truck bed that utilizes less parts than the prior art driven roller arrangement.

SUMMARY OF THE INVENTION

The present invention is a material handling device that includes a base, a first longitudinally extending conveyor secured to the base and a second longitudinally extending conveyor secured to the base, where the first conveyor and the second conveyor are positioned laterally adjacent to each other. Each of the conveyors includes a longitudinally extending belt having a first end and a second end, a first drum rotatably secured to the base and secured to the first end of the belt, a second drum rotatably secured to the base and secured to the second end of the belt, the first drum longitudinally spaced apart from the second drum, a first drive arrangement for rotating the first drum and a second drive arrangement for rotating the second drum. A control is coupled to the first drive arrangements and the second drive arrangements. The control is adapted to activate a respective one of the first drive arrangements causing the respective belt to wind around the respective first drum and move in a first direction as well as activate a respective one of the second drive arrangements causing the respective belt to wind around the respective second drum and move in a second direction. The control is adapted to move the belts of the first conveyor and the second conveyor simultaneously or separately. The material handling device base can be secured to a vehicle trailer.

Each of the belts can be made of a pull belt secured to a load belt. The pull belt is secured to the first drum and the load belt is secured to the second drum. A roller can be provided on each of the conveyors. The rollers are rotatably secured to the body and positioned adjacent to the second drums and coact with the respective belts.

The respective first drive arrangement and second drive arrangement can include hydraulic motors. The control is fluidly coupled to the hydraulic motors and includes a hydraulic fluid reservoir, a pump fluidly coupled to the hydraulic fluid reservoir and a flow diverter fluidly coupled to the pump. The flow diverter is also fluidly coupled to the hydraulic motors, whereby the diverter controls an equal amount of hydraulic fluid passing through a respective hydraulic motor when the first conveyor and the second conveyor operate simultaneously.

The first drums of the first conveyor and the second conveyor are secured to a securement plate which is secured to the base. Each of the first drums is supported by a support structure that includes a first stationary tube secured to the base, the tube slidably receiving a first end portion of the drum, a second stationary tube secured to the securement plate and positioned within the drum, a first bearing member received on the second stationary tube and a second bearing member received on the first bearing member, whereby the first bearing member and the second bearing member are sandwiched between an inner surface of the drum and an outer surface of the second stationary tube. An internal hub is secured to the drum, wherein the first bearing member and the second bearing member are sandwiched between an inner surface of the hub and an outer surface of the second stationary tube. The first and second bearing members are made of polymeric material and the drums and the second stationary tube are made of metal. Preferably, the first bearing member and the second bearing member are made of ultra high molecular weight polyethylene.

Preferably, the first bearing member includes a cylindrical body having an annular lip and the second bearing member includes a cylindrical body having an annular lip. When the cylindrical body of the first bearing member is slidably received by the cylindrical body of the second bearing member, the cylindrical body of the first bearing member and the cylindrical body of the second bearing member are sandwiched between the inner surface of the drum and the outer surface of the stationary tube. The annular lip of the first bearing member slidably contacts the annular lip of the second bearing member. The annular lip of the first bearing member and the annular lip of the second bearing member are sandwiched between the securement plate and the drum.

Each of the second stationary tubes includes a faceplate secured to the securement plate. The faceplates of each of the first drums and each of the second drums define a plurality of spaced holes that align with a plurality of spaced holes defined in the respective securement plates. A plurality of fasteners pass through the holes of the adjacent ones of the faceplate so that the fasteners secure the adjacent faceplates to respective ones of the securement plates.

A housing is provided that contains the first drums of the first conveyor and the second conveyor and a second housing is provided to contain the second drums of the first conveyor and the second conveyor.

A longitudinally extending guide track is provided and secured to the base. A first guide is secured to the belt of the first conveyor and a second guide is secured to the belt of the second conveyor. The first guide and the second guide are received by the guide track, whereby the first guide and the second guide travel on the guide track as the respective belts are moved by the drums and align the respective belts. The guides can be secured to the previously mentioned clamps. Preferably, the guide tracks include two longitudinally extending U-shaped profiles positioned between and adjacent to the first conveyor and the second conveyor. Each of the profiles defines a guide receiving cavity and each of the first guide and the second guide includes a guide shoe received within the guide receiving cavity adjacent the respective conveyor.

A stopping arrangement can be provided for stopping the first drums and the second drums based upon the position of the belts. The stopping arrangement includes two spaced apart limit switches which can include inductive sensors secured to the base and an arrangement is provided to activate the sensors secured to the belt.

BRIEF DESCRIPTION OF THE DRAWINGS

FIG. 7b shows a section taken along line VIIb—VIIb of FIG. 7a;

DESCRIPTION OF THE PREFERRED EMBODIMENT

For purposes of description herein, the terms "upper", "lower", "right", "left", "rear", "front", "vertical"; "horizontal" and derivatives thereof shall relate to the invention as oriented in the drawing figures. However, it is to be understood that the invention may assume various alternative orientation and step sequences, except where expressly specified to the contrary. It is also to be understood that the specific device and process illustrated in the attached drawings and described in the following specification are simply an exemplary embodiment of the inventive concepts defined in the appended claims. Hence, specific dimensions and other physical characteristics relating to the embodiment disclosed herein are not to be considered as limiting, unless the claims expressly state otherwise.

Figure 1:
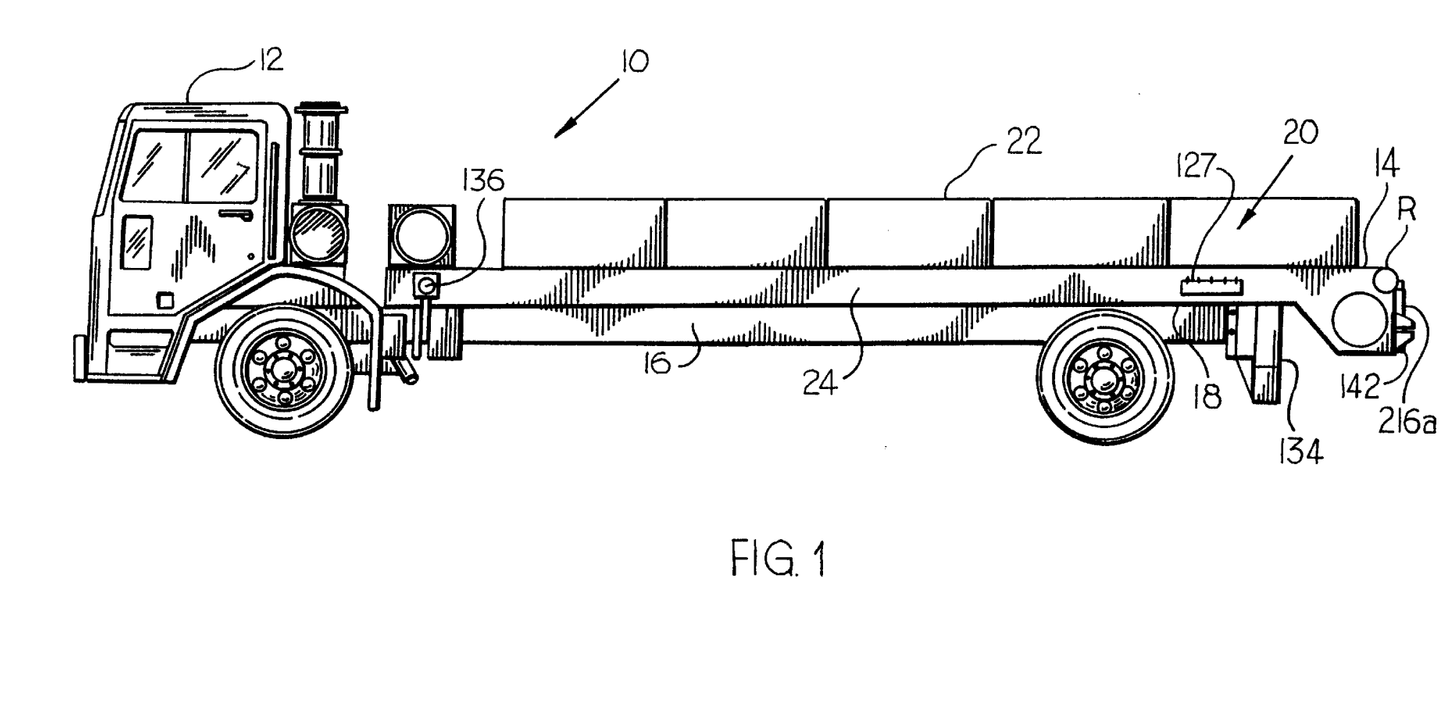
FIG. 1 is a side elevational view of a truck including a material handling device made in accordance with the present invention.

FIG. 1 shows a cargo handling truck bed made in accordance with the present invention. Specifically, FIG. 1 shows a truck 10 having a cab 12 and a trailer 14. The trailer 14 includes a body 16 and a bed 18 secured to the body 16. The bed 18 includes a cargo or material handling device 20 for moving cargo, such as boxes 22.

Figure 2:
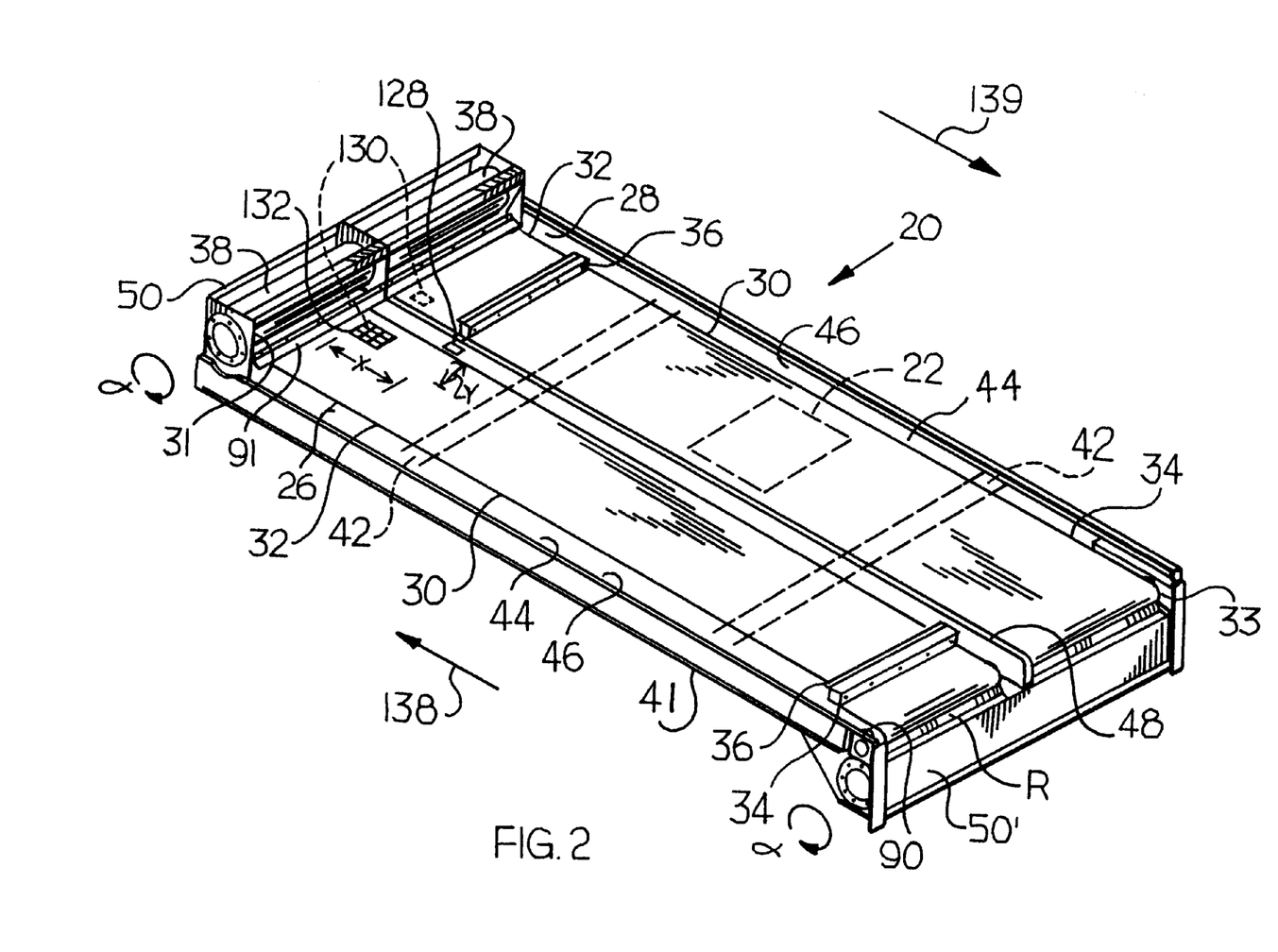
FIG. 2 is a top perspective view of the material handling device shown in FIG. 1.

Referring to FIG. 2, the material handling device 20 includes a frame or base 24 and two longitudinally extending conveyors 26 and 28 positioned laterally adjacent to each other and secured to the base 24. Each conveyor 26 and 28 includes a longitudinally extending belt 30 having a first end 31 and a second end 33. Each belt 30 is made up of two sections, a pull belt 32, which includes the first belt end 31 and a load belt 34, which includes the second belt end 33. A metallic belt clamp 36 secures the pull belt 32 to the load belt 34. The pull belt 32 (at the first belt end 31) is secured to a front drum or first drum 38 which is rotatably secured to the base 24. The load belt 34 (at the second belt end 33) is secured to a rear drum or second drum 40 which is rotatably secured to the base 24. Preferably, the pull belt 32 and the load belt 34 are made of a woven fabric.

A plurality of frame members 41 and cross members 42 (shown in phantom) make up the base 24. Two longitudinally extending supports 44 are secured to the cross members 42. Each support includes a lower plywood portion approximately 1⅜" thick having an upper portion 46 made of low friction material, such as high density polyethylene or ultra high molecular weight polyethylene. A lower surface of each belt 30 rests on the upper portion 46 of a respective one of the supports 44. A central longitudinally extending guide track 48 is positioned between conveyors 26 and 28. The guide track 48 is made up of two upwardly extending U-shaped extrusions welded to the cross members 42 of the base 24.

Figure 3:
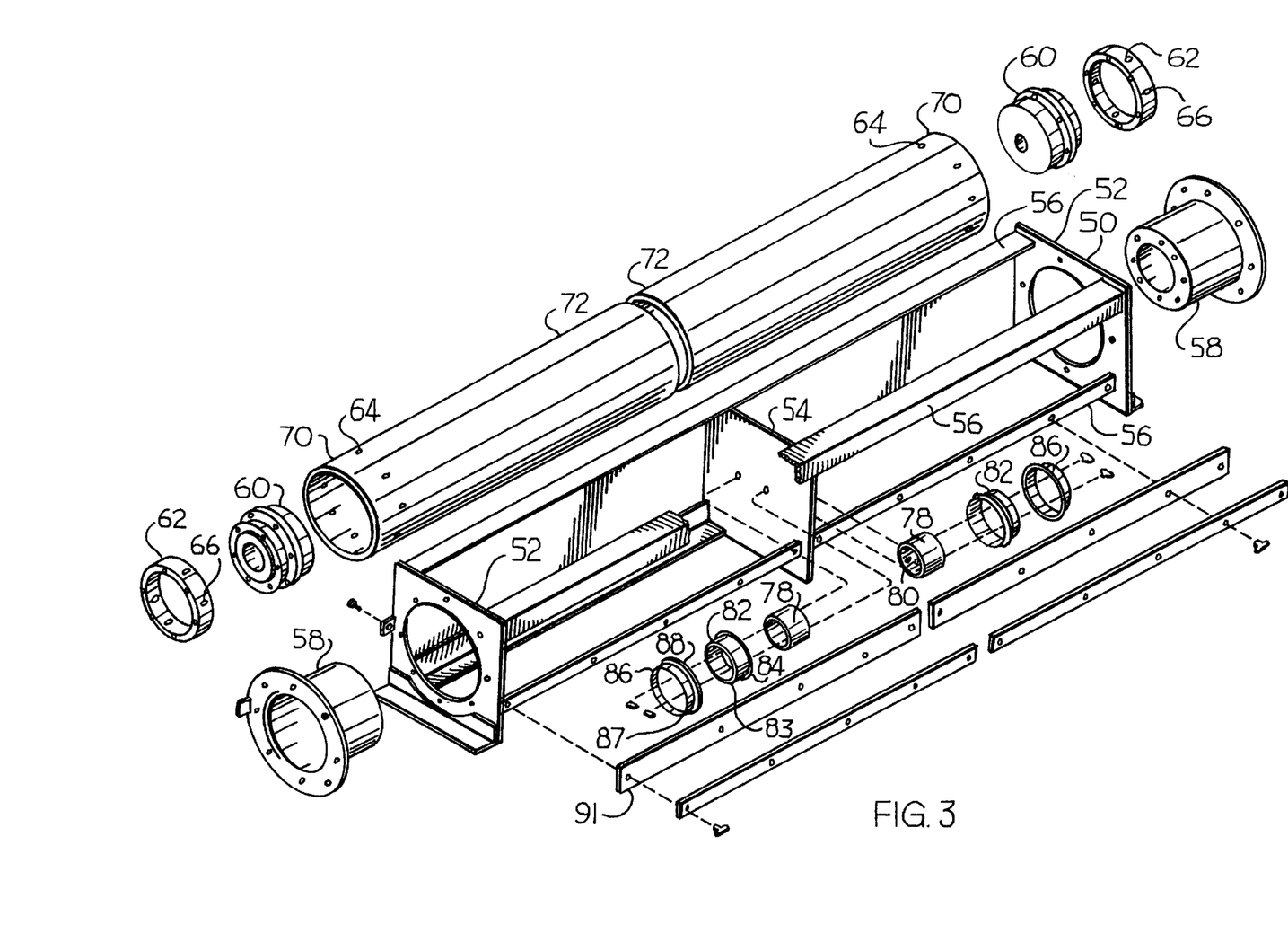
FIG. 3 is a top perspective exploded view of a front drive arrangement made in accordance with the present invention.

Referring to FIG. 3, which shows a front drive arrangement, each front drum 38 is received in a housing 50 which is secured to the base 24 that includes spaced apart anchor plates 52 and a securement plate 54 secured to each other by members 56. Since both front drums 38 are the same and secured to the housing 50 in the same manner, only the specific details of one front drum 38 will be described.

In a manner described in U.S. Pat. No. 4,760,971, anchor plate 52 receives a flanged first stationary tube 58 secured thereto by threaded fasteners. A gear reducer 60 is positioned within an internal cavity defined by the front drum 38 and is secured to an inner surface of the front drum 38 via a gear reducer ring 62 which is threadably secured to the gear reducer 60. Threaded fasteners pass through holes 64 and 66 engaging the gear reducer 60 to the front drum 38 and permitting the gear reducer 60 to drive the front drum 38 through the fasteners.

Figure 4:
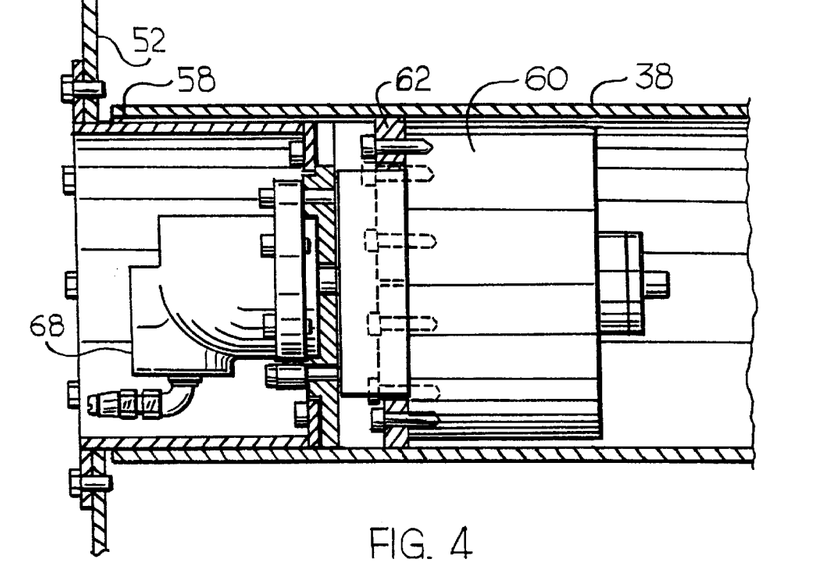
FIG. 4 is an elevation, partially in section, of a portion of the front drive arrangement.

As shown in FIG. 4, a hydraulic motor 68 is secured to the gear reducer 60. The front drum 38 includes two ends 70 and 72. End 70 of front drum 38 is slidably received on the first stationary tube 58. End 72 is rotatably secured to the securement plate 54.

Figure 5:
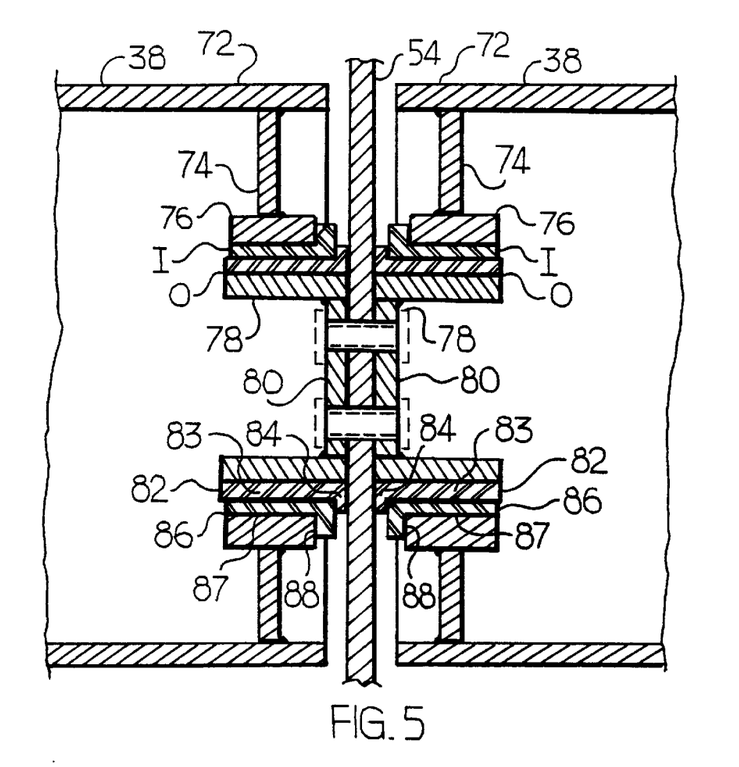
FIG. 5 is a sectional view of another portion of the front drive arrangement.

As shown in FIG. 5, an annular plate 74 is secured to an inner surface of the front drum 38. An internal hub 76 is secured to the annular plate 74. A second stationary tube 78 is threadably secured to the securement plate 54 via a faceplate 80 through a threaded fastener and nut arrangement (shown in phantom) and is positioned within the front drum 38. The faceplate 80 is welded to the second stationary tube 78, which includes a plurality of spaced holes aligned with spaced holes provided in the securement plate 54 through which the threaded fasteners pass to secure the faceplate 80 to the securement plate 54.

An inner cylindrically-shaped bearing 82 having a cylindrical body portion 83 and an annular lip 84 is slidably received on an outer surface of the second stationary tube 78. An outer cylindrically-shaped bearing 86 having a cylindrical body portion 87 and an annular lip 88 is slidably received by or on an outer surface of the inner bearing 82 and an inner surface of the hub 76. The inner bearing 82 and the outer bearing 86 are preferably made of ultra high molecular weight polyethylene. In this arrangement, the bearings 82 and 86 are sandwiched between an inner surface I of the front drum 38 via the hub 76 and an outer surface O of the second stationary tube 78 so that the cylindrical body portions 83 and 87 are slidably received or contacted by each other. Lips 84 and 88 slidably contact each other and are sandwiched between the securement plate 54 and an axial outer surface S of the hub 76 of the first drum 38. The lips 84 and 88 act as spacers and thrust bearings positioning the front drums 38 away from the securement plate 54 and keeping the body portions 83 and 87 of the bearings 82 and 86 in place.

Referring to FIGS. 2 and 3, a wiper 91 and a wiper clamp are secured to a forward one of the members 56. The wiper 91 contacts an upper surface of the pull belt 32 to wipe debris from the pull belt 32.

Figure 6:
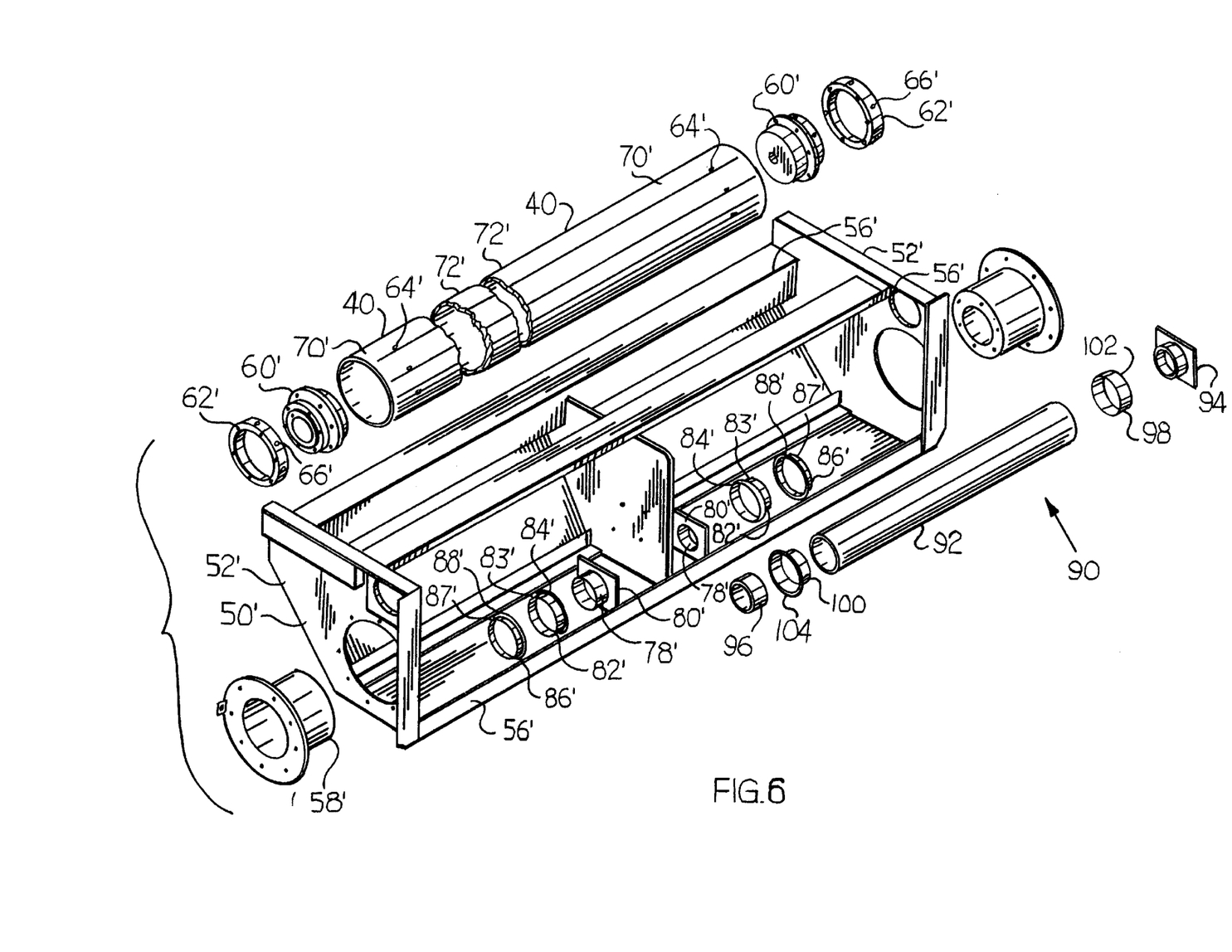
FIG. 6 is a top perspective exploded view of a rear drive arrangement made in accordance with the present invention.

Referring to FIG. 6, which shows a rear drive arrangement, each of the rear drums 40 is received in a housing or frame 50' that includes spaced apart anchor plates 52' and a securement plate 54' secured to each other by members 56'. The rear drums 40 operate and are secured to the anchor plates 52' and the securement plate 54' in a similar manner as previously discussed for front drums 38 and the rear drive arrangement is similar to the front drum arrangement, except for the below noted differences. Hence, the specific features of the rear drums 40 will be discussed in general. Similar to the front drive arrangement, each anchor plate 52' receives a flanged first stationary tube 58'. Since both rear drums 40 are the same and secured to the housing 50' in the same manner, only the details of one rear drum 40 will be discussed. A gear reducer 60' is secured to an inner surface of the rear drum 40 via a gear reducer ring 62'. Threaded fasteners pass through holes 64' and 66' engaging the gear reducer 60' to the rear drum 40 and permitting the gear reducer 60' to drive the rear drum 40 through the fasteners. A hydraulic motor (not shown) is secured to the gear reducer 60'. The rear drum 40 includes two ends 70' and 72'. End 70' of the rear drum 40 is slidably received on the first stationary tube 58'.

End 72' is rotatably secured to the securement plate 54' through an annular plate (not shown), a hub (not shown), a second stationary tube 78' having a faceplate 80' welded thereto, an inner cylindrically-shaped bearing 82' having a body 83', an annular lip 84' and an outer cylindrically-shaped bearing 86' having a body 87' and an annular lip 88'. The above primed elements interact and coact with the rear drums 40 in the same manner that the unprimed elements interact and coact with the front drums 38 and, therefore, will not be discussed in any further detail.

Two idler rollers 90, of which only one is shown in FIG. 6, are rotatably secured to the housing 50' and are positioned adjacent to and above rear drums 40. The idler rollers 90 are rotatably secured to the base 24 through the frame 50'. Each conveyor 26 and 28 includes one idler roller 90. Each of the idler rollers 90 includes a tube 92 having one end rotatably secured to the anchor plate 52' by a bearing support 94 secured thereto by threaded fasteners. The other end is rotatably secured to the securement plate 54' by a bearing support 96. Threaded fasteners secure bearing supports 94 and 96 to anchor plates 52' and securement plate 54', respectively. Bearings 98 and 100, similar to inner bearing 82, are slidably received by the respective bearing supports 94 and 96. Each of the bearings 98 and 100 includes a body and outwardly extending annular lips 102 and 104, whereby the bodies of the bearings 98 and 100 are sandwiched between an inner surface of the bearing supports 94 and 96 and the annular lips 102 and 104 are sandwiched between the respective ends of the idler roller 90 and the securement plate 54' and the anchor plate 52'.

Preferably, the bearings 82, 86, 98 and 100 are made from a polymeric material, such as ultra high molecular weight polyethylene, and the other parts contacting the bearings 82, 86, 98 and 100, such as the drums 38 and 40 and second stationary tubes 78 and 78', are made of metal, such as steel.

Referring back to FIG. 2, the housings 50 and 50' are secured to the frame 24 so that the first ends 31 of the belts 30 are secured to the first drums 38 and the second ends 33 of the belts 30 are secured to the rear drums 40. Bottom surfaces of the load belts 34 pass over an outer surface of the idler rollers 90 prior to coacting with the rear drums 40.

Figure 7A:
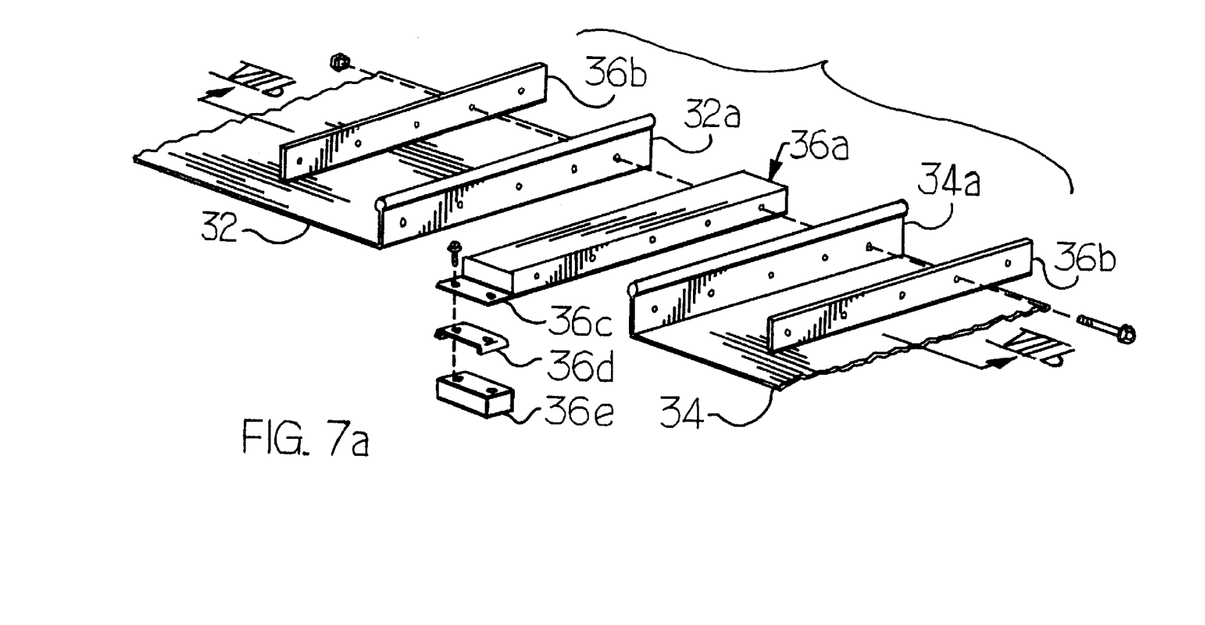
FIG. 7a is an exploded perspective view of a clamp and guide arrangement made in accordance with the present invention.
Figure 7B:
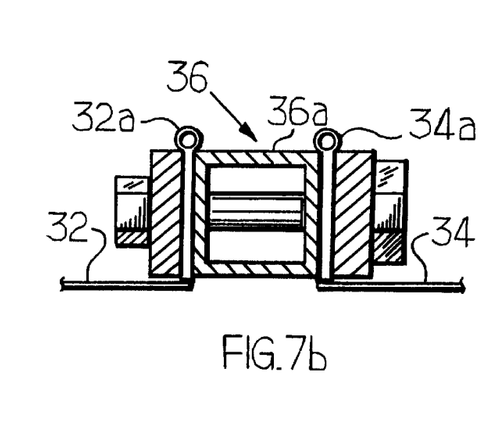
Figure 7C:
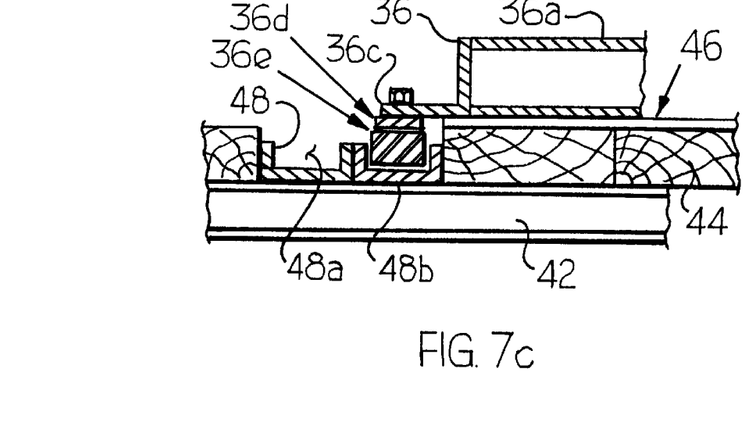
FIG. 7c is a sectional view of a portion of the clamp and guide arrangement shown in FIGS. 7a and 7b.

Referring to FIGS. 7a–7c, the belt clamp 36 is shown in more detail. The belt clamp 36 includes a central belt clamp tube 36a and two belt clamp bars 36b. An end 32a of the pull belt 32 and an end 34a of the load belt 34 are sandwiched between respective belt clamp bars 36b and the belt clamp tube 36a as shown in FIG. 7b. The belt clamp 36 is held together by a plurality of bolts and nuts passing through holes defined in the belt ends 32a and 34a, the belt clamp tube 36a and the belt clamp bars 36b. A tab 36c is defined at an end of the belt clamp tube 36a. A guide shoe support 36d and a guide shoe or guide 36e are secured to the tab 36c by threaded fasteners. Preferably, the belt clamp tube 36a, belt clamp bars 36b and guide shoe 36e are made of metal. Preferably, the guide shoe 36e is made of ultra high molecular weight polyethylene or other polymeric material. Referring to FIG. 7c, the guide shoe 36e rides in a cavity 48a defined in the guide track 48. Guide track 48 includes two elongated U-shaped profiles 48b positioned between and adjacent to the two conveyors 26 and 28, wherein respective guide shoes 36e ride or travel in the cavities 48a defined in the appropriate profile 48b as the respective belts 30 are moved by the front drums 38 and rear drums 40 so as to align the respective belts 30.

Figure 8:
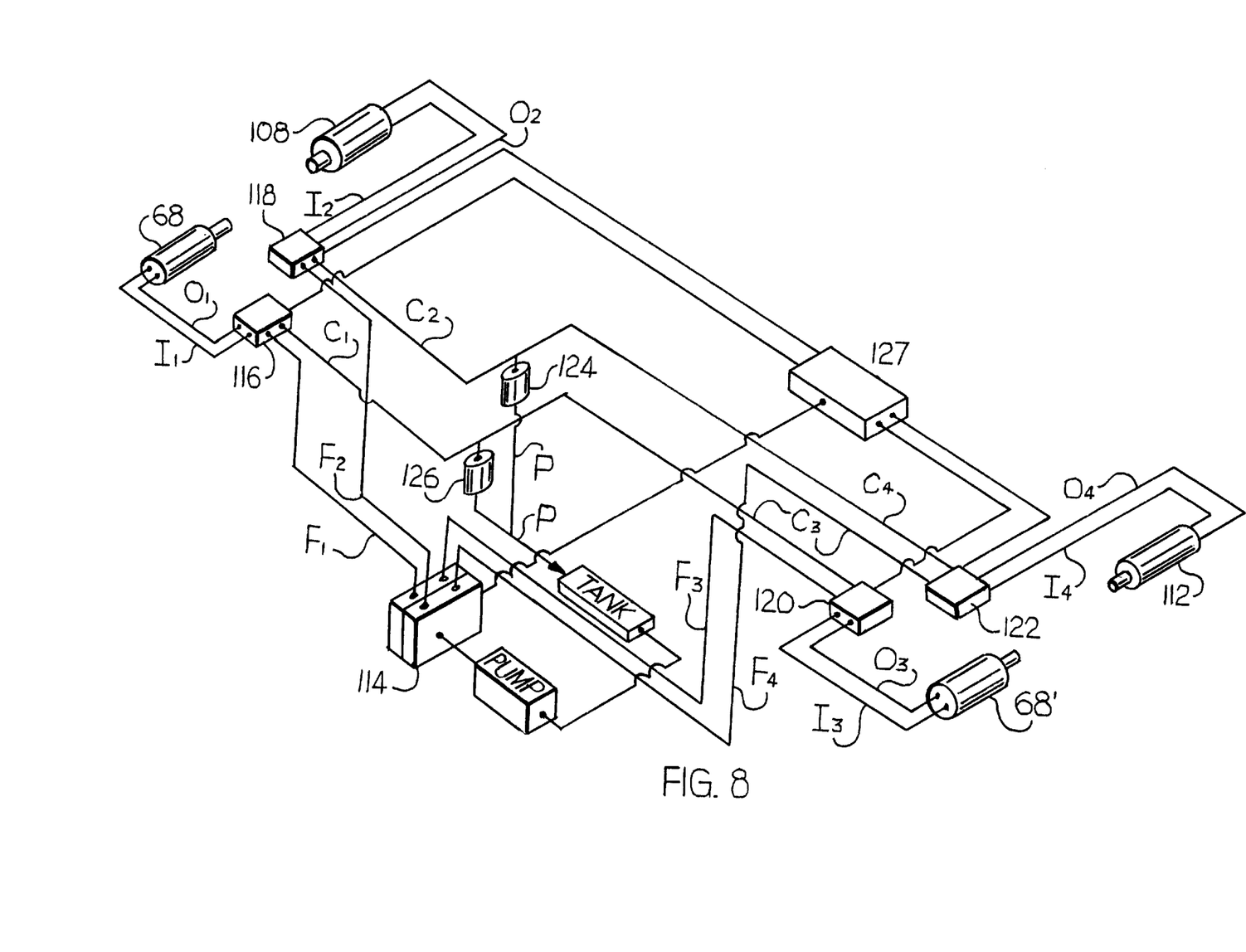
FIG. 8 is a schematic view of a hydraulic system for the material handling device made in accordance with the present invention.

FIG. 8 shows a schematic view of the hydraulic circuit or system that operates hydraulic motors 68, 108, 68' and 112, where hydraulic motors 68 and 108 drive front drums 38 and hydraulic motors 68' and 112 drive rear drums 40. Specifically, hydraulic fluid or oil is supplied in a reservoir or tank which is fluidly coupled to a pump. The pump is fluidly coupled to a directional control valve 114. Fluid conduits $F_1$, $F_2$, $F_3$ and $F_4$ fluidly couple the directional control valve 114 to respective valves 116, 118, 120 and 122. Valves 116, 118, 120 and 122 are fluidly coupled to hydraulic motors 68, 108, 68' and 112 via inlet lines $I_1$, $I_2$, $I_3$ and $I_4$ and outlet lines $O_1$, $O_2$, $O_3$ and $O_4$. Valves 116, 118, 120 and 122 are also fluidly coupled to the reservoir via conduits $C_1$, $C_2$, $C_3$ and $C_4$, which are coupled to check valves 124 and 126 and piping P. The pump, the directional control valve 114 and valves 116, 118, 120 and 122 are electrically coupled to controls 127.

Referring back to FIG. 2, two limit switches 128 and 130 are attached to each of the longitudinally extending supports 44. Preferably, the limit switches 128 and 130 are inductive proximity sensors. The limit switches 128 and 130 are spaced apart from each other a lateral distance Y and a longitudinal distance X. A metal meshed piece 132 is secured to each of the pull belts 32 at a position where, when the belt clamp 36 is positioned near a rearward end R of the longitudinally extending support 44, the metal meshed piece 132 is positioned over a respective limit switch 130. As can be seen, the pull belts 32 are positioned over limit switches 130, but not over limit switches 128. The limit switches 128 and 130 are coupled to the fluid circuit through controls 127 to stop movement of the belts 30 as will be discussed below.

Referring to FIG. 1, hydraulic longitudinally extendable piston arrangements 134 are secured to the body 16 so that pistons from the piston arrangements 134 engage the frame 24 near a rear end thereof. The forward end of the frame 24 is pivotally secured to the body 16 by pins 136. In this manner, the frame 24 can be inclined by activation of the piston arrangements 134 in a manner known in the art.

The following is a discussion of the operation of the material handling device 20 forming the cargo handling truck bed simultaneously operating the conveyors 26 and 28.

Referring to FIGS. 2 and 8, front drums 38 and rear drums 40 are rotated in a clockwise direction α by passing hydraulic fluid through hydraulic motors 68 and 108. This causes both the load belts 34 and the pull belts 32 to move in a forward direction 138 thereby causing the pull belts 32 to be wound around the front drum 38 and the load belts 34 to be unwound from the rear drum 40. Once the metallic belt clamps 36 pass over the limit switches 128, hydraulic fluid to the respective hydraulic motors 106 and 108 is stopped by closing the directional control valve 114 causing the rotation of front drums 38 and rear drums 40 and belts 30 to stop. The limit switches 128 send a signal to controls 127, which then prevents further winding of the belt 30 around the front drum 38. In this manner, the metallic belt clamps 36 come to rest in a position adjacent to the housings 50 so that the load belts 34 extend substantially across the longitudinally extending supports 44. Packages or material, such as boxes 22, can be placed on an upper surface of the load belts 34. Alternatively, boxes 22 (as shown in FIG. 1) can be placed on the upper surface of the load belts 34 as the load belts 34 are moved in the forward direction 138 or the load belts 34 can be incrementally stopped so that the boxes 22 can be placed thereon.

When the truck 10 is moved to a destination to remove the boxes 22, then a rear end of the truck 10 is placed adjacent a loading dock (not shown). The operator then positions him or herself at the material handling controls 127. First, it is determined whether the frame 24 is to be inclined by the piston arrangements 134. If so, an appropriate control lever of controls 127 is adjusted to cause the rear end 142 of the bed 18 to move in an upwardly direction. The piston arrangements 134 (shown in FIG. 1) are actuated by a hydraulic pump (not shown). After the height of frame 24 is adjusted, then the operator must determine whether the boxes 22 positioned on the load belts 34 are to be removed simultaneously or not. In some instances, only boxes 22 positioned on one of the load belts 34 may need to be removed. Further, the operator must determine at what speed the boxes 22 are to be conveyed by the belt 30.

If the belt 30 of the conveyor 26 is to be operated, then the operator adjusts the controls 127 so that the directional control valve 114 permits hydraulic oil or fluid to flow through either hydraulic motor 68'. In this manner, hydraulic fluid will pass through the reservoir to the pump into the directional control valve 114 through, for example, conduit $F_3$, valve 120, hydraulic motor 68', inlet $I_3$ and outlet $O_3$. The hydraulic fluid then flows through valve 120, conduit $C_3$, check valve 126 and piping P back into the reservoir or tank. Alternatively, if the belt 30 of the conveyor 28 is to be operated, then the appropriate lever of controls 127 is adjusted so that the directional control valve 114 permits the hydraulic fluid to flow through conduit $F_4$, valve 122, hydraulic motor 112, inlet $I_4$, outlet $O_4$, again through valve 122, conduit $C_4$, check valve 124, piping P and back to the tank or reservoir. Further, both hydraulic motors 68' and 112 can be operated at the same speed by adjustment of the appropriate levers of the controls 127.

As the pull belt 32 moves toward a rear end 142 of the trailer 14, the mesh piece 132 (of which only one is shown) passes over limit switch 130 causing the directional control valve 114 to close preventing hydraulic fluid from flowing through the hydraulic motor 60 stopping rotation of the rear drum 40 and front drum 38 and preventing the belt 30 from further winding around the rear drum 40. In the above manner, the hydraulic oil flowing through hydraulic motor 68' and/or hydraulic motor 112 causes the rear drum 40 to rotate in a counterclockwise direction thereby causing the load belt 34 to wind around the rear drum 40. Likewise, the pull belt 32 unwinds from the front drum 38 and the belt clamp 36 and belt 30 moves in a rearward direction 139. The unwinding of the belt 30 from the front drum 38 causes the front drum 38 to rotate in a counterclockwise direction.

The above-identified process is reversed to reload the respective load belt 34 with cargo, such as boxes 22. Hence, when the belt clamp 36 passes over the limit switch 130, rotation of the front drum 38 and rear drum 40 stops. After the boxes 22 are loaded onto the belts 30, the piston arrangements 134 are deactivated so that the frame 24 is in a horizontal position.

In other words, the controls 127 are coupled to the front drums 38 and rear drums 40 and are adapted to activate a respective one of the front drive arrangements causing the respective belt 30 to wind around a respective front drum 38 and move in the forward direction 138 or activate a respective one of the rear drive arrangements causing the respective belt 30 to wind around a respective rear drum 40 and move in the rearward direction 139. The controls 127 are adapted to move the conveyors 26 and 28 simultaneously or separately.

During movement of the belts 30, the guide shoes 36e travel in the respective guide track profiles 48b, thereby maintaining the belts 30 in an aligned position. This prevents the belts 30 from moving in a lateral or Y direction which could cause the belts 30 to bind. An alternative arrangement would be to replace the guide shoe 36e and guide shoe support 36d with a roller adapted to engage with upwardly extending legs of the track profile 48b.

An important feature of the present invention is the unique bearing arrangement of the inner bearings 82 and the outer bearings 86. As shown in FIG. 5, the sets of ultra high molecular weight polyethylene bearings 82 and 86 and 82' and 86' ride on one another and coact with one another to align the front drums 38 and rear drums 40 with the respective securement plates 54 and 54'. It is believed that the inner bearings 82 and 82' riding on the outer bearings 86 and 86' provide a lifetime bearing arrangement for the material handling device 20. In this manner, the bearings 82 and 82' and 86 and 86' need not be inspected or replaced and/or periodically oiled as would be the case if roller-type or ball bearings were used.

Furthermore, the present invention requires substantially less parts than the prior art dual-type conveyors which include a plurality of driven rollers extending along the truck bed. Each of these rollers requires separate bearings and a chain and sprocket drive. This results in a tremendous amount of inventory required to maintain the conveyors. Our invention requires only a few parts which are described herein. Furthermore, it is believed that the present invention provides a lifetime bearing arrangement which need not be periodically inspected. It is to be noted that although a hydraulic arrangement is used to drive the drums 38 and 40, other drive arrangements can be used, such as electric motors.

Figure 9:
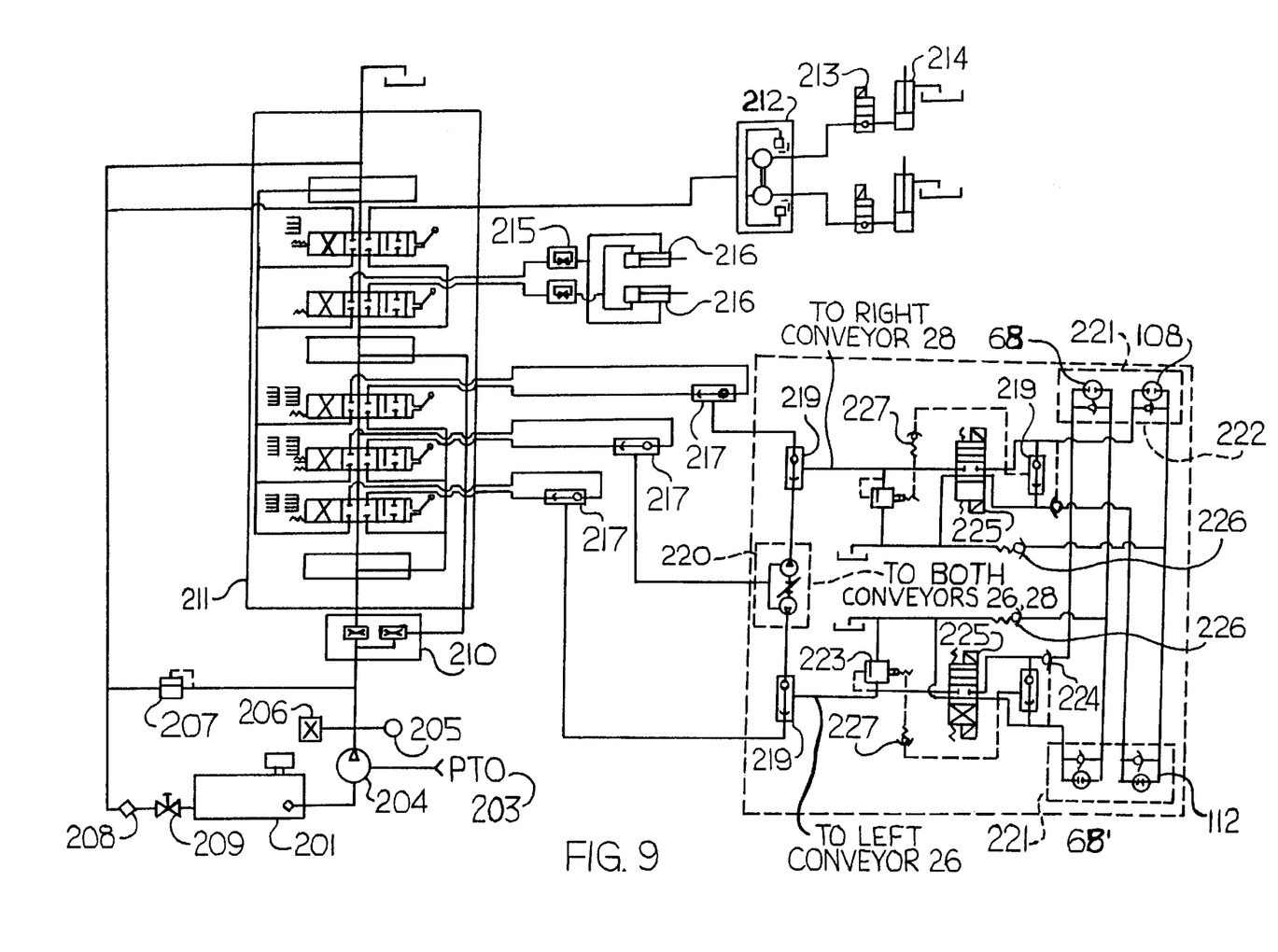
FIG. 9 is a more detailed schematic view of the hydraulic system shown in FIG. 8.

FIG. 9 shows a more detailed schematic view of a hydraulic circuit of the present invention. The hydraulic pump 204 is coupled to the power take-off (PTO) 203 installed on the truck transmission. The hydraulic pump 204 is of a rotary gear design which is well known in the art. The hydraulic pump 204 operates when the PTO 203 is engaged by operating the PTO control switches provided on the controls 127 shown in FIG. 10.

A return line filter 208 is located adjacent the hydraulic oil tank 201 at the bottom of the return line inlet. This is a low pressure filter and is rated at 300 psi static pressure and has a ten micron replaceable canister element. A tank shutoff valve 209 permits shutting off oil flow while servicing the return line filter 208. A throttle advance valve 206 is located at the rear of the engine on the left side. The throttle advance valve 206 is linked by a cable to the truck engine throttle. It advances the engine's speed when the valve throttle advance valve 206 senses a need for greater hydraulic flow. An adjustable relief valve 207 is positioned aft of the hydraulic oil tank 201 and is set at 2,000 psi operating pressure. A pressure gauge 205 is located near the pressure relief valve 207. The pressure gauge 205 indicates pressures of 0 to 3,000 psi. An adjustable flow control valve 210 is linked by a rod to a conveyor speed control handle near the rear of the truck or controls 127. The adjustable control valve 210 increases oil flow to the directional valve conveyor control spools when the conveyor speed handle is moved toward a maximum position.

Figure 10:
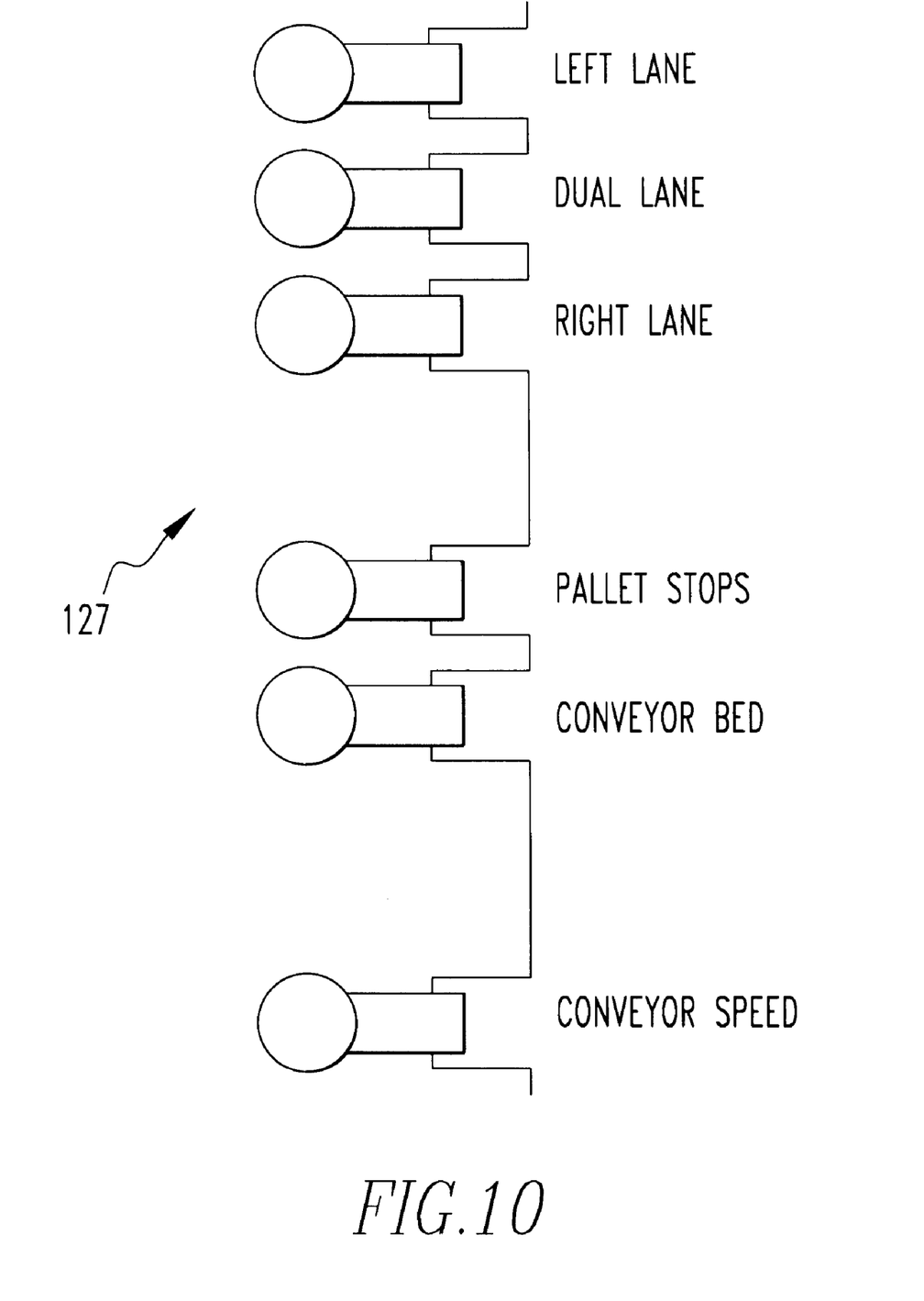
FIG. 10 is a schematic view of a control for the material handling device made in accordance with the present invention.

A directional control valve 211 is a five spool, open center, manually operated valve linked by rods to control handles on the controls 127. The directional control valve 211 is a Gresen Model No. V20-4-4*-4CF4-4*-NR-LCHA with CP center springs, manufactured by Gresen Manufacturing Company of Minneapolis, Minn. Each valve spool is operated independently by a control handle connected to a spool. The directional control valve 211 is located beneath the conveyor bed and the rear of the truck. The directional control valve functions as follows. The left lane spool controls the flow of hydraulic oil to the hydraulic motors driving the left lane conveyor belt 30 of conveyor 26. The dual lane spool directs hydraulic oil to both the left and right side conveyor hydraulic drive motors simultaneously by routing oil through a flow diverter 210. The right lane spool directs hydraulic fluid to the right lane hydraulic motors only driving the right lane conveyor belt 30 of the conveyor 28. The pallet stops spool controls a flow of hydraulic oil to the pallet restraint cylinders and the conveyor bed spool controls the flow of hydraulic oil to the conveyor lift or the piston arrangements 134. The dual lane, left lane, right lane and conveyor bed spools are equipped with electrical switches. These switches are actuated when control handles of controls 127 for these spools are operated as shown in FIG. 10. When actuated, these switches send current to solenoids on electrically operated directional valves and lock valves for the conveyor motors and lift cylinders 214.

Two lift cylinders 214 of the piston arrangement 134 provide the force needed to raise and lower the rear of the conveyor bed. These single acting, single stage cylinders connect the rear of the conveyor bed to the body super structure. A proportional divider/combiner valve 212 divides and combines hydraulic oil flow to and from the lift cylinders 214 so that they can operate simultaneously. Two cylinder lock valves 213 prevent the lift cylinders 214 from lowering unless the lock valves 213 are released (opened) electrically. The lock valves 213 are normally closed two-way, two-positioned, solenoid-operated poppet valves. When closed, each lock valve 213 allows fluid into, but not out of, the lift cylinder 214. When the conveyor bed control is placed in the down position, it makes contact with a switch on the valve spool, sending current to the lock valve solenoids causing the lock valves 213 to open. Opening the lock valves 213 permits the lift cylinders 214 to lower.

Two pallet restraint (lock) cylinders 216 provide the force needed to raise and lower the pallet restraints 216a shown in FIG. 1. Pallet restraints 216a include a cross bar extending across the width of the body and secured to the cylinders 216. These are double-acting cylinders. Flow control valves 215 on both the "extend" and "retract" lines to the pallet restraint lock cylinders 216 control the rate at which the restraint lock cylinders 216 extend and retract. In the extended position, the cylinders and a bar prevent the boxes 22 from falling out of the rear end of the truck 10. The restraint lock cylinders 216 must be retracted to remove the boxes 22 from the truck 10. Seven shuttle valves 217 and 219 direct hydraulic oil into the appropriate paths for conveyor lane operation based on pressure and flow in the system.

Four hydraulic motors 221 power the conveyor belt drive rollers and correspond to hydraulic motors 68, 108, 68' and 112. Two hydraulic motors are positioned on each side of the conveyor bed, located at the front and rear rollers. All of the hydraulic motors 68, 108, 68' and 112 are bi-directional motors. Four 5 psi check valves 222 prevent the hydraulic motors 68, 108, 68' and 112 from cavitation due to changes in flow as the belts travel, and changes the loads on the various motors. The check valves 222 compensate for these flow variations.

A rotary flow divider valve 220 directs hydraulic oil in equal amounts to all hydraulic motors 68, 108, 68' and 112 when the dual lane control spool is actuated and the conveyors 26 and 28 run simultaneously. Two directional control valves 225 supply hydraulic oil to power the conveyor belt hydraulic motors. These solenoid operated valves 225 are actuated by electric switches located adjacent to the left lane, right lane and dual lane control handles as shown in FIG. 10. One directional control valve 225 controls the front and rear hydraulic motors for the left side conveyor belt. The second valve 225 controls the front and rear hydraulic motors for the right side of the conveyor belt. Two pressure compensator valves 223 serve as unloading valves to relieve excess system pressure at relatively low settings of these valves, rather than at a high pressure setting of the primary pressure relief valve. The pressure compensator valves 223 divert excess hydraulic flow back to the tank when the pressure exceeds a level of 200 to 300 hundred psi above the normal pressure when the belts are moving. The pressure compensator valves 223 function when the belt reaches the end of its travel and at other times when pressure builds up to their pressure setting. Two check valves 227 assist the operation of the pressure compensator valves 223. Once the pressure compensator valves 223 begin to relieve pressure, the check valves 227 prevent the pressure compensator valves 223 from being shut down by intermittent flow (and pressure spikes) until the directional control valves 211 shut off flow to the circuit.

Back pressure check valves 226 in the tank return lines keep hydraulic oil flowing between the front and rear hydraulic motors on the same side instead of taking the path of least resistance back to the hydraulic oil tank 201 during conveyor belt operation. Back pressure check valves 226 allow fluid to return to the hydraulic oil tank 201 only when a differential pressure of 65 psi is exceeded. Two pilot operated check valves 224 help prevent forward load shifts when the truck brakes are applied. Preferably, the truck's 12 volt DC alternator/battery and electrical system powers all electrical functions of the material handling device 20.

The above invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A material handling device, comprising:
   a) a base;
   b) a first longitudinally extending conveyor secured to said base;
   c) a second longitudinally extending conveyor secured to said base, said first conveyor and said second conveyor positioned laterally adjacent to each other, each of said conveyors, comprising:
      i) a longitudinally extending belt having a first end and a second end;
      ii) a first drum rotatably secured to said base and secured to said first end of said belt;
      iii) a second drum rotatably secured to said base and secured to a second end of said belt, said first drum longitudinally spaced apart from said second drum;
      iv) first drive means for rotating said first drum; and
      v) second drive means for rotating said second drum;
   d) a securement plate secured to said base, wherein said first drums of said first conveyor and said second conveyor are secured to a securement plate;
   e) a support structure for supporting each of said first drums, said support structure, comprising:
      a first stationary tube secured to said base, said tube slidably receiving a first end portion of said drum;
      a second stationary tube secured to said securement plate and positioned within said drum;
      a first bearing member received on said second stationary tube; and
      a second bearing member received on said first bearing member, whereby said first bearing member and said second bearing member are sandwiched between an inner surface of said drum and an outer surface of said second stationary tube; and
   f) a control coupled to said first drive means and said second drive means, whereby said control is adapted to activate a respective one of said first drive means causing said respective belt to wind around said respective first drum and move in a first direction, and said control adapted to activate a respective one of said second drive means causing said respective belt to wind around said respective second drum and move in a second direction, said control adapted to move said belts of said first conveyor and said second conveyor simultaneously or separately.

2. A material handling device as claimed in claim 1, wherein each of said belts is made up of a pull belt secured to a load belt, said pull belt secured to said first drum and said load belt secured to said second drum.

3. A material handling device as claimed in claim 1, wherein each of said conveyors further comprises a roller rotatably secured to said body and positioned adjacent said second drum and coacting with said belt.

4. A material handling device as claimed in claim 1, wherein said respective first drive means and said second drive means comprise hydraulic motors.

5. A material handling device as claimed in claim 4, wherein said control is fluidly coupled to said hydraulic motors and said control comprises a hydraulic fluid reservoir, a pump fluidly coupled to said hydraulic fluid reservoir and a flow diverter fluidly coupled to said pump, said diverter fluidly coupled to said hydraulic motors, whereby said diverter controls an equal amount of hydraulic fluid passing through respective hydraulic motors when said first conveyor and said second conveyor are run simultaneously.

6. A material handling device as claimed in claim 1, further comprising an internal hub secured to said drum, wherein said first bearing member and said second bearing member are sandwiched between an inner surface of said hub and an outer surface of said second stationary tube.

7. A material handling device as claimed in claim 1, wherein said first bearing member and said second bearing member are made of a polymeric material and said first drums, said second drums and said second stationary tube are made of metal.

8. A material handling device as claimed in claim 7, wherein said first bearing member and said second bearing member are made of ultra high molecular weight polyethylene.

9. A material handling device as claimed in claim 1, wherein said first bearing member includes a cylindrical body having an annular lip and said second bearing member includes a cylindrical body having an annular lip, said cylindrical body of said first bearing member is slidably received by the cylindrical body of said second bearing member, said cylindrical body of said first bearing member and said cylindrical body of said second bearing member are sandwiched between said inner surface of said drum and said outer surface of said stationary tube and said annular lip of said first bearing member slidably contacting said annular lip of said second bearing member, and said annular lip of said first bearing member and said annular lip of said second bearing member sandwiched between said securement plate and said drum.

10. A material handling device as claimed in claim 1, wherein said second stationary tube includes a faceplate, said faceplate secured to said securement plate.

11. A material handling device as claimed in claim 10, wherein said faceplates of each of said first drums and each of said second drums define a plurality of spaced holes that align with a plurality of spaced holes defined in said respective securement plates and a plurality of fasteners passing through the holes of adjacent ones of said faceplates so that said fasteners secure said adjacent faceplates to respective ones of said securement plates.

12. A material handling device of claim 11, wherein said fasteners are threaded fasteners.

13. A material handling device as claimed in claim 1, wherein each of said first drive means and said second drive means comprises a hydraulic motor secured to a gear box coupled to and positioned within an internal cavity of a respective one of said first drum and said second drum.

14. A material handling device as claimed in claim 1, wherein said base is secured to a vehicle trailer.

15. A material handling device as claimed in claim 1, further comprising a housing containing said first drums of said first conveyor and said second conveyor and another housing containing said second drums of said first conveyor and said second conveyor.

16. A material handling device as claimed in claim 1, further comprising a longitudinally extending guide track secured to said base and a first guide secured to said belt of said first conveyor and a second guide secured to said belt of said second conveyor, said first guide and said second guide received by said guide track, whereby said first guide and said second guide travel in said guide track as said respective belts are moved by said drums and align said respective belts.

17. A material handling device as claimed in claim 16, wherein each of said belts is made up of a pull belt secured to a load belt by a clamp, said pull belt secured to said first drum and said load belt secured to said second drum, and wherein said first guide is secured to said clamp of said first conveyor and said second guide is secured to said clamp of said second conveyor.

18. A material handling device as claimed in claim 17, wherein said guide tracks include two longitudinally extending U-shaped profiles positioned between and adjacent to said first conveyor and said second conveyor, each of said profiles defining a guide receiving cavity and each of said first guide and said second guide comprising a guide shoe received within the guide receiving cavity adjacent said conveyor.

19. A material handling device as claimed in claim 1, each of said conveyors further comprising stopping means for stopping said first drums and said second drums based upon the position of said belts.

20. A material handling device as claimed in claim 19, wherein said stopping means comprises two spaced apart limit switches secured to said base and means to activate said limit switches secured to said belt.

21. A material handling device as claimed in claim 20, wherein each of said limit switches comprises an inductive sensor.

22. A material handling device, comprising:
   a) a base;
   b) a first longitudinally extending conveyor secured to said base;
   c) a second longitudinally extending conveyor secured to said base, said first conveyor and said second conveyor positioned laterally adjacent to each other, each of said conveyors, comprising:
      i) a longitudinally extending belt having a first end and a second end;
      ii) a first drum rotatably secured to said base and secured to said first end of said belt;
      iii) a second drum rotatably secured to said base and secured to a second end of said belt, said first drum longitudinally spaced apart from said second drum;
      iv) first drive means for rotating said first drum; and
      v) second drive means for rotating said second drum;
   d) a control coupled to said first drive means and said second drive means, whereby said control is adapted to activate a respective one of said first drive means causing said respective belt to wind around said respective first drum and move in a first direction, and said control adapted to activate a respective one of said second drive means causes said respective belt to wind around said respective second drum and move in a second direction, said control adapted to move said belts of said first conveyor and said second conveyor simultaneously or separately; and
   e) a longitudinally extending guide track secured to said base and a first guide secured to said belt of said first conveyor and a second guide secured to said belt of said second conveyor, said first guide and said second guide received by said guide track, whereby said first guide and said second guide travel in said guide track as said respective belts are moved by said drums and align said respective belts, wherein each of said belts is made up of a pull belt secured to a load belt by a clamp, said pull belt secured to said first drum and said load belt secured to said second drum, and wherein said first guide is secured to said clamp of said first conveyor and said second guide is secured to said clamp of said second conveyor.

23. A material handling device as claimed in claim 22, wherein said guide tracks include two longitudinally extending U-shaped profiles positioned between and adjacent to said first conveyor and said second conveyor, each of said profiles defining a guide receiving cavity and each of said first guide and said second guide comprising a guide shoe received within the guide receiving cavity adjacent said conveyor.

\* \* \* \* \*